United States Patent
Ryder et al.

(10) Patent No.: US 9,700,015 B2
(45) Date of Patent: Jul. 11, 2017

(54) SYSTEM FOR METERING FEED IN FEED LINES

(75) Inventors: Drew Ryder, Willmar, MN (US); Neal Tovsen, Apple Valley, MN (US)

(73) Assignee: Feedlogic Corporation, Willmar, MN (US)

(*) Notice: Subject to any disclaimer, the term of this patent is extended or adjusted under 35 U.S.C. 154(b) by 1055 days.

(21) Appl. No.: 13/818,255

(22) PCT Filed: Aug. 23, 2011

(86) PCT No.: PCT/US2011/048802
§ 371 (c)(1),
(2), (4) Date: Jul. 8, 2013

(87) PCT Pub. No.: WO2012/027364
PCT Pub. Date: Mar. 1, 2012

(65) Prior Publication Data
US 2013/0276709 A1    Oct. 24, 2013

Related U.S. Application Data

(60) Provisional application No. 61/376,386, filed on Aug. 24, 2010.

(51) Int. Cl.
*A01K 1/10* (2006.01)
*A01K 39/00* (2006.01)
(Continued)

(52) U.S. Cl.
CPC .......... *A01K 5/0258* (2013.01); *A01K 5/0275* (2013.01); *G01G 11/003* (2013.01); *G01G 19/32* (2013.01); *G01G 23/3742* (2013.01)

(58) Field of Classification Search
CPC ...... A01K 1/0209; A01K 5/00; A01K 5/0114; A01K 5/02; A01K 5/0225; A01K 5/0258;
(Continued)

(56) References Cited

U.S. PATENT DOCUMENTS 3,415,228 A * 12/1968 Myers ................. A01K 39/01
119/51.11
3,901,194 A * 8/1975 Meyer ................. A01K 5/0275
119/53

(Continued)

FOREIGN PATENT DOCUMENTS

AT     384147 B     10/1987
DE     671808       2/1939
(Continued)

OTHER PUBLICATIONS

"AT384147B1—English Translation".
(Continued)

*Primary Examiner* — Jennifer E Novosad
(74) *Attorney, Agent, or Firm* — Schwegman Lundberg & Woessner, P.A.

(57) ABSTRACT

A method for measuring feed flow, feed is moved through a flexible pipe using a flexible auger operably positioned within the pipe. Feed flow through a metered section (309) of the flexible pipe is metered using a feed meter (304) attached to the flexible pipe. The feed meter includes load cell (312) configured to detect strain induced by feed mass within the metered section (309). Metering feed includes providing a measure of mass flow of the feed, using the load cell (312), when the feed moves through the metered section (309).

8 Claims, 13 Drawing Sheets

(51) Int. Cl.
*A01K 5/00* (2006.01)
*A01K 5/02* (2006.01)
*G01G 11/00* (2006.01)
*G01G 19/32* (2006.01)
*G01G 23/37* (2006.01)

(58) Field of Classification Search
CPC ............. A01K 5/0275; G01G 23/3742; G01G 11/003; G01G 19/32
USPC ..... 119/51.01, 51.02, 51.11–51.15, 53, 56.1, 119/56.2, 57.1–57.5, 57.7, 57.92; 222/58, 222/185.1, 410–413, 527
See application file for complete search history.

(56) References Cited

U.S. PATENT DOCUMENTS

| | | | |
|---|---|---|---|
| 4,468,972 A | 9/1984 | Fisher et al. | |
| 4,491,955 A | 1/1985 | Kydd | |
| 4,712,511 A * | 12/1987 | Zamzow | A01K 5/0266 119/51.02 |
| 4,765,190 A | 8/1988 | Strubbe | |
| 4,911,940 A | 3/1990 | Steiner et al. | |
| 4,981,107 A * | 1/1991 | Beaudoin | A01K 5/0208 119/56.2 |
| 5,318,475 A | 6/1994 | Schrock et al. | |
| 5,487,702 A | 1/1996 | Campbell et al. | |
| 5,782,201 A | 7/1998 | Wells | |
| 5,818,131 A | 10/1998 | Zhang | |
| 6,526,120 B1 | 2/2003 | Gray et al. | |
| 7,578,193 B2 | 8/2009 | Davidson | |
| 7,805,281 B2 | 9/2010 | Leigh | |
| 8,242,920 B1 | 8/2012 | Mostowfi et al. | |
| 2002/0152895 A1 | 10/2002 | Duffy et al. | |
| 2005/0000277 A1 | 1/2005 | Giles | |
| 2006/0225516 A1 | 10/2006 | Luehrs | |
| 2007/0221125 A1 | 9/2007 | Kaushal et al. | |
| 2009/0105969 A1 | 4/2009 | Saylor | |
| 2012/0227647 A1 | 9/2012 | Gelinske | |
| 2013/0199450 A1 * | 8/2013 | Harty, Sr. | A01K 5/0225 119/51.02 |
| 2013/0276709 A1 * | 10/2013 | Ryder | A01K 5/0258 119/51.01 |
| 2015/0355003 A1 | 12/2015 | Saeger et al. | |
| 2016/0041015 A1 | 2/2016 | Sheverev et al. | |
| 2016/0246296 A1 | 8/2016 | Gelinske | |

FOREIGN PATENT DOCUMENTS

| | | |
|---|---|---|
| DE | 19517283 C1 | 3/1996 |
| GB | 2170319 A | 7/1986 |
| WO | WO-2010065373 A1 | 6/2010 |
| WO | WO-2012027364 A2 | 3/2012 |
| WO | WO-2012027364 A3 | 3/2012 |
| WO | WO-2014/110340 A1 | 7/2014 |

OTHER PUBLICATIONS

"International Application Serial No. PCT/US2011/048802, International Preliminary Report on Patentability mailed Dec. 10, 2012", 7 pgs.

"International Application Serial No. PCT/US2011/048802, International Search Report mailed Mar. 14, 2012", 12 pgs.

"International Application Serial No. PCT/US2011/048802, Invitation to Pay Additional Fees mailed Nov. 21, 2011", 7 pgs.

"International Application Serial No. PCT/US2011/048802, Written Opinion mailed Mar. 14, 2012", 11 pgs.

"International Application Serial No. PCT/US2011/048802, Written Opinion mailed Aug. 10, 2012", 6 pgs.

"European Application Serial No. 11751760.7, Office Action mailed Apr. 4, 2013", 2 pgs.

"European Application Serial No. 11751760.7, Response filed Mar. 1, 2013", 7 pgs.

"European Application Serial No. 11751760.7, Response filed Oct. 14, 2014 to Office Action mailed Apr. 4, 2013", 16 pgs.

"International Application Serial No. PCT/US2014/010998, International Preliminary Report on Patentability mailed Jul. 23, 2015", 7 pgs.

"International Application Serial No. PCT/US2014/010998, International Search Report mailed May 2, 2014", 2 pgs.

"International Application Serial No. PCT/US2014/010998, Written Opinion mailed May 2, 2014", 5 pgs.

U.S. Appl. No. 14/760,425, Non Final Office Action mailed Jan. 9, 2017, 20 pgs.

\* cited by examiner

SYSTEM FOR METERING FEED IN FEED LINES

CLAIM OF PRIORITY

This application is a U.S. National Stage Filing under 35 U.S.C. 371 from International Application No. PCT/US2011/048802, filed on Aug. 23, 2011, and published as WO 2012/027364 A2 on Mar. 1, 2012, which claims the benefit of priority of U.S. Provisional Patent Application Ser. No. 61/376,386, filed on Aug. 24, 2010, which application and publication are incorporated by reference herein in their entirety.

TECHNICAL FIELD

This application relates generally to feed systems, and more particularly to systems and methods for metering feed in feed lines and to related applications.

BACKGROUND

Farms use feed lines to move feed from feed bins to livestock feeding stations. A flexible auger feed line system is a common feed line system used to feed livestock. In this system a flexible auger is operably positioned within a flexible pipe (e.g. polyvinyl chloride (PVC) pipe). A motor is connected to the flexible auger to rotate the auger and move feed through the pipe to the feed stations.

The feed flow through a flexible auger feed line system may be rated with a nominal feed flow rate. A manufacturer of the flexible auger feed line system, for example, may identify the nominal feed flow rate for when the feed line is full and the auger drive is on. However, it is difficult to monitor the amount of feed flowing through the feed lines. For example, feed may "bridge" in the feed bin, such that the feed lines are not moving feed at full capacity.

The feed may be "mixed" feed where the particular mixture is intended to meet particular needs of the livestock. For example, growth charts have been proposed that attempt to identify the appropriate feed mixture for various growth stages of the livestock. For example, a large feed mill may mix a batch of feed, and then transport the batch or a portion of the batch to the farm site. A batch of feed may be mixed on farm by statically weighing ingredients to provide the appropriate ratios of ingredients, and then mixing the ingredients together.

For some time, livestock producers have sought a way to mix feed and/or apply micro-ingredients easily on-farm rather than having them pre-mixed in batches, reducing waste of these valuable products by targeting them more effectively and reducing or eliminating the problem of having left-over feed mixture which cannot or should not be fed to the next batch of animals to be fed. Today, producers must either vacuum this left-over feed out of bins or waste it on the next group of animals which do not require the product.

Micro-ingredients may be added to base livestock feed to improve growth performance, control disease, or improve feed efficiency. These ingredients are added to the feed at different inclusion rates based on the manufacturers' certifications or recommendations for optimal efficacy. These ingredients are typically included at rates between 0.25 lb and 10 lb/ton. To date these ingredients have largely been handled by feed mills which use batch mixing systems to add the product to the base feed mix. Feed mills may use a series of micro-ingredient containers suspended on load cells and add one ingredient at a time by measuring loss in weight. Mixes are typically batched up in amounts of three tons or more and loaded on trucks for delivery to feed storage bins on farms. For example, when mixing drugs into feed, mills frequently interrupt production and purge equipment before mixing the next batch.

There is a need to monitor the amount and the make-up of the consumed feed. For example, current regulation in Europe and pending federal legislation in the U.S. on the use of therapeutic drugs in livestock feed are pushing the demand for more precise application of micro-ingredients on-farm. Legislation is also driving the requirement for more thorough process verification in livestock feed mixing and delivery. Producers may soon need to provide auditable evidence of the application of controlled products.

Various on-farm micro-ingredient applicators have been marketed in the past. However, these applicators have not provided satisfactory accuracy in mixing and product inclusion rates. They also have not provided methods to record mixing activities, warnings of low volume levels, or the ability to include product at varying rates in response to changing conditions.

SUMMARY

According to an embodiment of a method for measuring feed flow, feed is moved through a flexible pipe using a flexible auger operably positioned within the pipe. Feed flow through a metered section of the flexible pipe is metered using a feed meter attached to the flexible pipe. The feed meter includes a load cell configured to detect strain induced by feed mass within the metered section. Metering feed includes providing a measure of mass flow of the feed, using the load cell, when the feed moves through the metered section.

A system embodiment includes a flexible auger system and a feed meter. The flexible auger system includes a flexible pipe and a flexible auger operably positioned within the pipe to move feed through the pipe. The flexible pipe includes a metered section used to provide a measure of feed flow through the pipe. The feed meter is attached to the flexible pipe. The feed meter includes a load cell configured to detect strain induced by feed mass within the metered section, to provide a measure of mass flow of feed as feed flows through the metered section.

According to an embodiment of a method for mixing feed ingredients, a feed ingredient is moved through a flexible pipe to a mixing element using a flexible auger operably positioned within the pipe. Feed flow through a metered section of the flexible pipe is metered using a feed meter attached to the flexible pipe. The feed meter includes a load cell configured to detect strain induced by feed mass within the metered section. Metering feed includes providing a measure of mass flow of the feed, using the load cell, when the feed moves through the metered section. Another feed ingredient is moved to the mixing element. An inclusion rate of the other feed ingredient to the mixing element is controlled using the measure of mass flow of feed provided by the feed meter. The feed ingredient and the other feed ingredient are mixed at the mixing element to provide mixed ingredients. The mixed ingredients are moved away from the mixing element. Moving the feed ingredient, moving the other feed ingredient, mixing, and moving the mixed ingredients are simultaneously performed.

According to an embodiment of a method for adding micro-ingredients into flowing feed, feed flows through a feed transport system, and a feed flow rate is determined as the feed flows through the feed transport system. An inclusion rate for at least one micro-ingredient is determined using the determined feed flow rate. One or more micro-ingredients are added into the flowing feed in the feed transport system according to the determined inclusion rate.

A system embodiment for adding micro-ingredients into flowing feed comprises a feed bin configured to store a base feed, a feed transport system configured to deliver feed from the feed bin to a plurality of livestock feeding stations, and an in-line micro-ingredient applicator. The in-line micro-ingredient applicator includes a feed flow rate detector, an inclusion rate calculator, a micro-ingredient container, and a micro ingredient injector. The feed flow rate detector is configured to determine a feed flow rate of base feed flowing in the feed transport system. The inclusion rate calculator is configured to determine a desired micro-ingredient inclusion rate for the determined feed flow rate of base feed. The micro-ingredient container stores one or more micro-ingredients. The micro-ingredient injector is configured to add the one or more micro-ingredients from the container into the feed transport system as the base feed is flowing through the feed transport system. The micro-ingredient injector is configured to provide a desired inclusion rate for the one-or-more micro-ingredients for the determined fed flow rate.

This Summary is an overview of some of the teachings of the present application and not intended to be an exclusive or exhaustive treatment of the present subject matter. Further details about the present subject matter are found in this application. Other aspects will be apparent to persons skilled in the art upon reading and understanding this application and viewing the drawings that form a part thereof, each of which are not to be taken in a limiting sense.

DETAILED DESCRIPTION

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. References to "an", "one", or "various" embodiments in this disclosure are not necessarily to the same embodiment, and such references contemplate more than one embodiment.

The livestock industry has not been able to take advantage of strategies to target the application of specific feed mixes to specific groups of animals for the purpose of reducing waste and lowering overall cost of production for the producer, because of the inefficiency of manufacturing many different types of feed mixes at a feed mill and the difficulty of coordinating delivery of these mixes. A programmable on-farm applicator allows the livestock industry to take advance of these strategies, and also allows both the livestock producer and the ingredient manufacturer to experiment with new strategies which improve efficacy by altering the feed mixtures (e.g. altering the amount and timing of micro-ingredient inclusion).

Figure 1A:
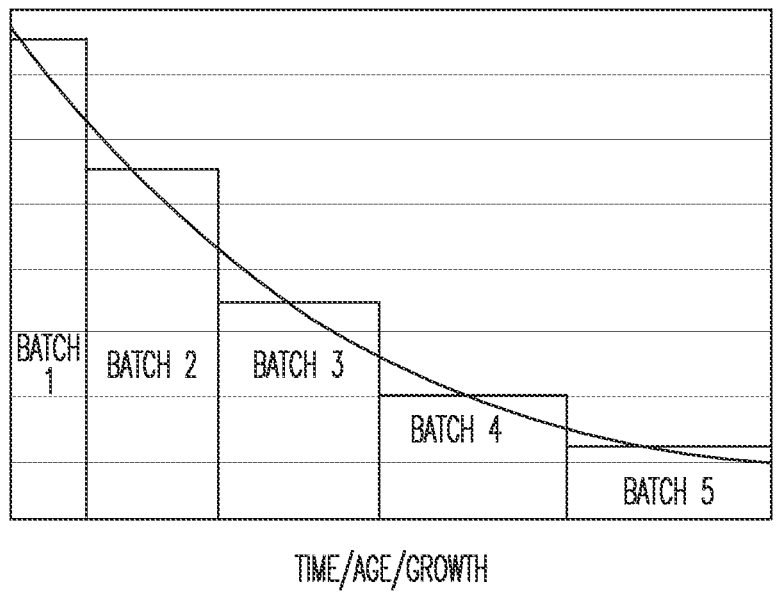
FIGS. 1A and 1B illustrate a demand curve for an ingredient, such as a micro-ingredient, in a feed as livestock may require a varied nutrition and/or varied dose of micro-ingredients over time (or over age or growth).
Figure 1B:
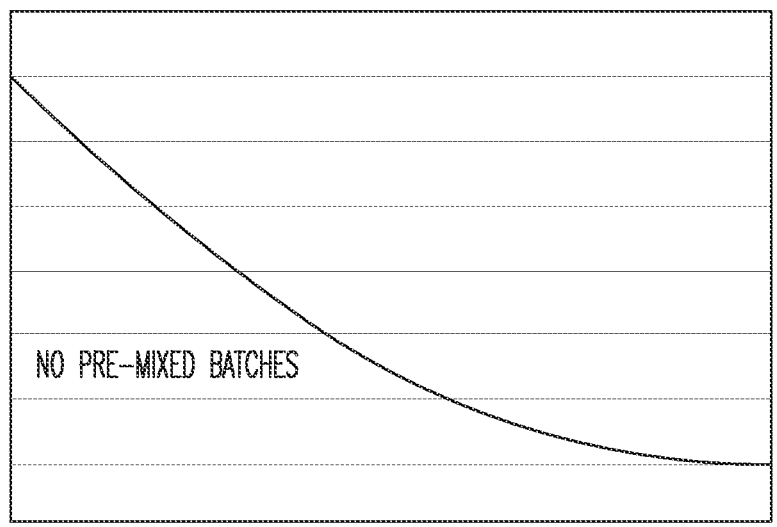

A desired feed mixture for livestock can vary because of a number of factors. FIGS. 1A and 1B illustrate a demand curve for an ingredient, such as a micro-ingredient, in a feed as livestock may require a varied nutrition and/or varied dose of micro-ingredients over time (or over age or growth). These figures further illustrate differences between ingredient step feeding (FIG. 1A) where each step involves a specially mixed batch of feed, and curve feeding (FIG. 1B) where the ingredients for the feed are mixed on the fly according to the demand curve. The curve is not intended to represent a specific feed ingredient or micro-ingredient, but rather is intended to represent that the desired mix ratio of the ingredient into the feed varies over the course of a lifetime of the animal. The producer may use five batches of feed as generally illustrated in FIG. 1A, each with a different mix ratio, to try to fit the demand curve. It can be difficult to manage separate batches of feed. Additionally, the batch will only rarely match the demand curve, as it will usually be either above or below the curve. FIG. 1B illustrates a "mix-on-the-fly" methodology which does not use premixed batches but rather mixes the feed as it moves through the feed line system, allowing the ingredient to be accurately added in a manner that closely follows the demand curve. Another benefit of the mix-on-the-fly methodology is that the farm only orders the base feed and the ingredient(s), and need not order separate batches of differently-mixed feed to satisfy the changing nutritional needs and/or micro-ingredient doses required by the growing animals. Thus, various embodiments include a controller configured to be programmed with a desired demand curve and programmed to follow the desired demand curve for applying ingredient(s) into the feed flow within a feed line.

One of the challenges with mixing feed as it moves through the feed line system is measuring the mass flow of feed through the feed line. The feed meter, discussed below, provides a real-time measurement of the mass flow of feed that can be used to control the inclusion of ingredient(s) into the flowing feed. The feed meter provides a measure of feed flow by weight as it passes through a feed line. The feed meter can be used to calculate and record the mass flow of feed through the feed line, and to automatically detect changes in feed density and volume.

The feed meter provides a rich source of feed data and real-time or near real-time access to feed flow information on the feed line at any time. As such, the feed meter may be used in applications other than mixing applications. For example, the feed meter can provide a real-time measurement of feed usage on-farm, monitor feed disappearance, track feed consumption to estimate growth rate which can be used to determine a desired timing to market the animals, detect problems with the feed lines such as feed bridging and feed outages, manage bin inventories to predict when the bin will be empty which improves scheduling of feed delivery and enables "just-in-time" inventory control of feed, and provide diagnostic and tracking information that can be used to identify feed waste, ensure that the right feed is being fed to the animals, see feed usage trends, and that can be used to automatically trigger notifications when feed flow or usage is out of a normal range (e.g. below or above a range considered to be normal). The feed meter can be attached to standard feed line track feed flow in feed lines that are in use on farm.

Figure 2:
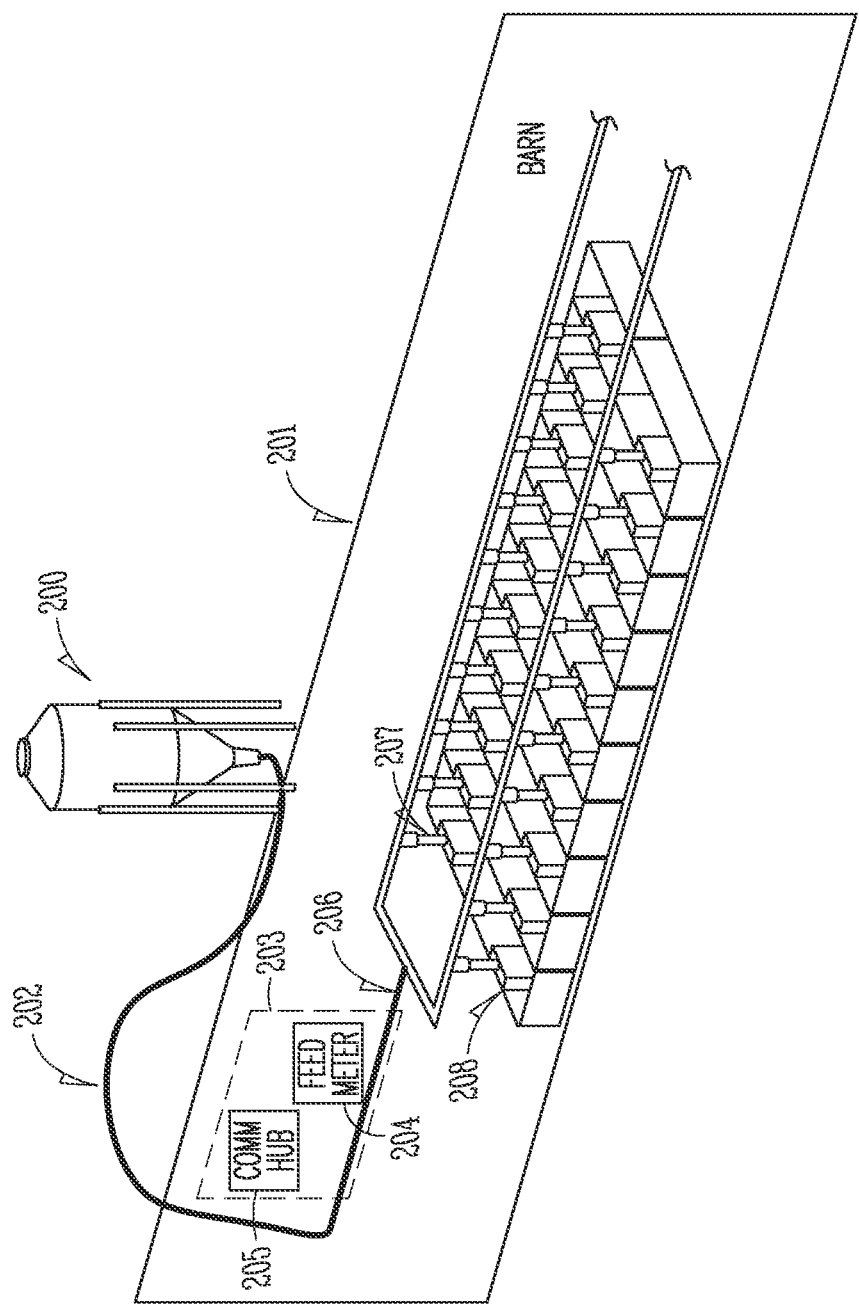
FIG. 2 illustrates an embodiment of a feed line system with a feed meter.

FIG. 2 illustrates an embodiment of a feed line system with a feed meter. The illustrated feed line system includes a feed bin 200 next to a livestock barn 201. A flexible auger system 202 draws feed from the feed bin 200 and delivers the feed into the barn 201. The feed line system includes a feed meter system 203, which includes a feed meter 204 operationally attached to the feed line to determine a mass flow rate of the feed. The illustrated feed meter system 203 also includes a communication hub 205 configured to communicate with the feed meter 204 and communicate with work station(s) or other device(s) to communicate information pertaining to the measure of mass flow of the feed from the feed meter and to communicate other information. The information pertaining the measure of mass flow of the feed may be raw load cell data, processed data to provide a mass value, processed data to provide a mass flow value, or various notices (e.g. messages, alarms, alerts) concerning the mass flow of feed. The communication may be used to enable the presentation and/or processing of the feed meter data. The feed meter 204 can be used to measure mass flowing in the flexible auger and provide a mass/time calculation (e.g. pounds or kilograms per minute or pounds or kilograms per second). The feed meter may store the mass flow rate data locally, or store the mass flow rate data in the communication hub 205 or in other devices that communicate directly or indirectly with the communication hub. The communication hub may send data, over wired and/or wireless connections, to other devices. For example, the communication hub may be wirelessly networked to one or more feed meters. The feed is delivered past the feed meter through the flexible auger system 206 to drop tubes 207 used to deliver the feed down to the feeders 208. An auger motor operates intermittently to deliver the feed from the feed bin to the drop tubes 207 and into the feeders 208.

In operation, feed is moved through a flexible pipe using a flexible auger operably positioned within the pipe. Feed flow through a metered section of the flexible pipe is metered using a feed meter attached to the flexible pipe. The feed meter includes a load cell configured to detect strain induced by feed mass within the metered section. Metering feed includes providing a measure of mass flow of the feed, using the load cell, when the feed moves through the metered section.

Figure 3:
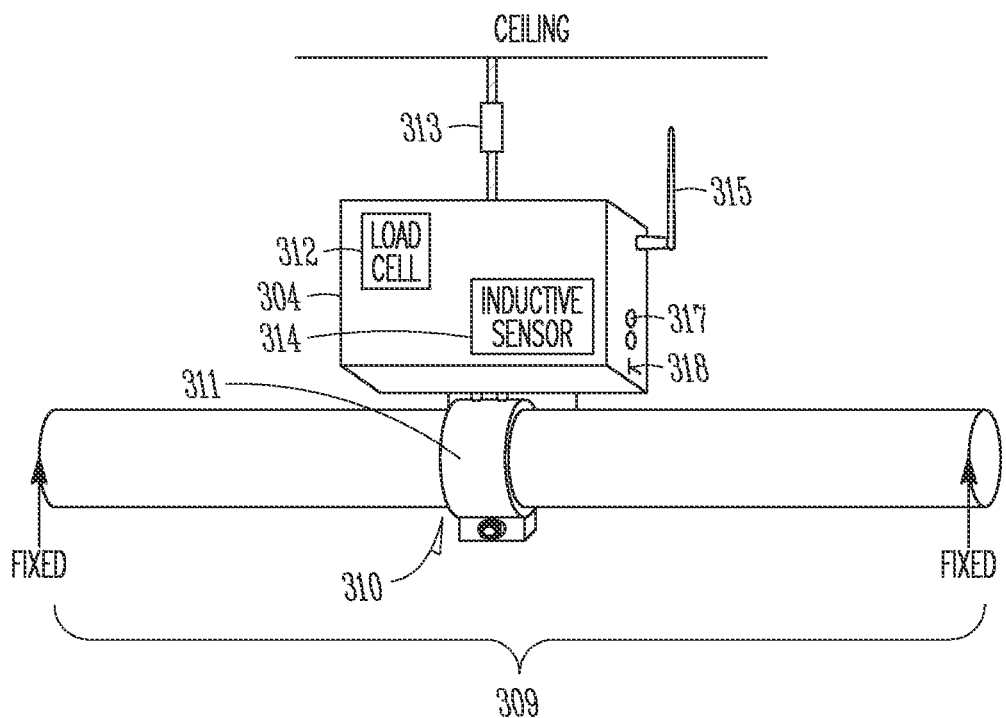
FIG. 3 illustrates an embodiment of a feed meter.

FIG. 3 illustrates an embodiment of a feed meter 304. The feed meter 304 illustrated in FIG. 3 may be used as the feed meter 204 in FIG. 2. FIG. 3 also illustrates an environment in which the feed meter 304 is installed. The feed meter is attached to a section 309 of a flexible auger pipe. The section 309 of pipe does not need a special connection to the flexible auger system. Rather, the section 309 of pipe may form an integral part of a longer pipe. The length of the section 309 between the fixed ends may be about eight feet, for example. Each end of the section 309 is fixed. For example, each end of the section 309 may be fixed to a structure within a barn, such as a truss, rafter or joist of the barn to greatly reduce movement of each end of the section 309. The center portion 310 of this section 309 of the flexible auger pipe, positioned between the fixed ends, is free to flex under the weight of the feed flowing through this section 309. The feed meter is attached to the center portion of this section 309 and to the structure such as to the roof of the barn, and is configured to provide a measure of the feed mass in the section of the flexible auger pipe.

The illustrated feed meter 304 is configured to be attached to a structure, such as a building structure like a ceiling of the barn, and includes a clamp 311 configured to clamp around the center portion of the section 309 of the flexible auger pipe. The clamp can be designed to accommodate different standard and non-standard pipe sizes. When feed is in the section 309 of pipe, the center portion 310 flexes down away from the ceiling. The feed meter 304 includes a load cell 312 configured to provide a measure of the strain induced by feed moving in this section 309 of the flexible auger pipe. The illustrated feed meter 304 also includes a tension adjustment 313, illustrated as a turn buckle, which is used to adjust the tension between the building structure and the pipe. This can be used to set the range of tension applied to the load cell in an operable range for the load cell.

The flexible auger pipe includes a flexible auger within the flexible pipe. Some embodiments of the feed meter include an inductive sensor 314 configured to sense when the flexible auger is close to the inductive sensor 314. Some embodiments use the inductive sensor to determine if the flexible auger and the auger drive is on or if the flexible auger is not moving and the auger drive is off. Instead of using an inductive sensor, some embodiments of the feed meter use the load cell 312 to detection vibration in the pipe that indicates a rotating flexible auger. The raw load cell data will be different depending on whether the flexible auger is on or off, and appropriate signal processing can be developed to not only sense the weight of the feed line such as may indicate if the feed line is full, partially full or empty, but to also determine if the flexible auger is rotating.

Figure 4:
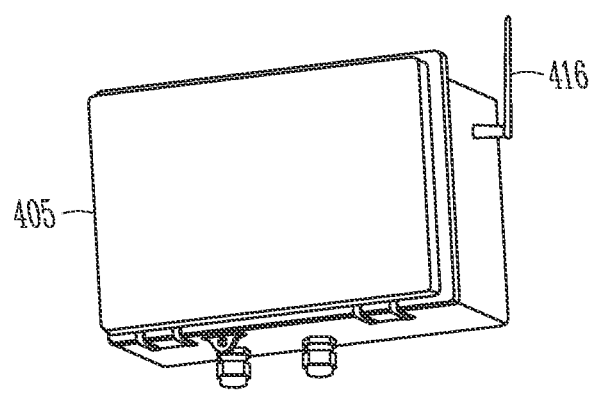
FIG. 4 illustrates an embodiment of a communication hub, such as may be used in may be used as the communication hub in FIG. 2.

FIG. 4 illustrates an embodiment of a communication hub 405, such as may be used in may be used as the communication hub 205 in FIG. 2. The feed meter 304 illustrated in FIG. 3 includes an antenna 315 and the communication hub 405 illustrated in FIG. 4 includes an antenna 416. The feed meter 304 and communication hub 405 include circuitry configured to provide wireless communication using the antennas 315 and 416. Some embodiments use a wired connection between the feed meter 304 and the communications hub 405 instead of a wireless communication connection. The communication hub 405 includes appropriate circuitry configured to communicate with other device(s) and send the feed meter data out to these other device(s). In some embodiments, the communication hub 405 communicates alarms or alerts local with respect to the communication hub, or at local work station(s) in the barn or on the farm where the feed meter is located, or at remote work station(s) off the farm where the feed meter is located. The communications hub may communicate over a local area network or a wide area network to provide information to a user. This information may include information pertaining to the measure of the mass flow of the feed. For example, a user may log into a website to monitor the feed usage and feed inventory for a feed line in a barn.

Figure 8:
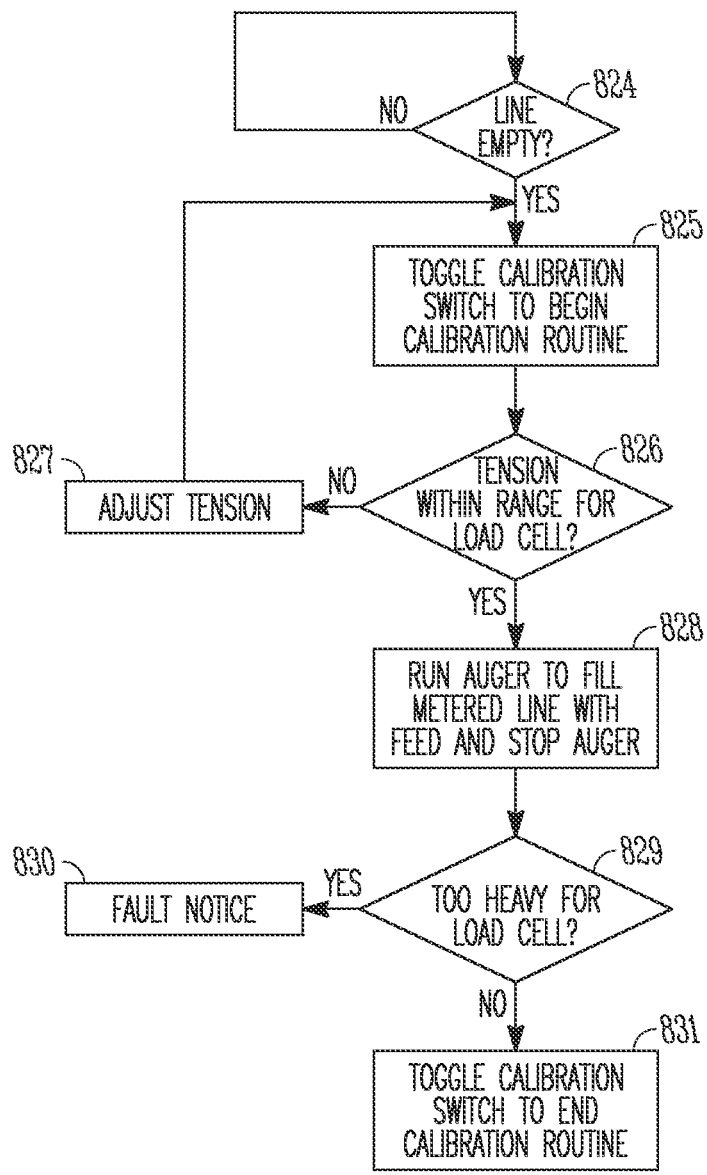
FIG. 8 illustrates an embodiment of a method for calibrating the feed meter of FIG. 3 after it is connected to the feed line.

The illustrated feed meter 304 includes light(s) 317, such as color light emitting diodes, used to determine the status of the feed meter. The feed meter also includes a calibration switch 318 used to perform the calibration process for the feed meter. An example of a calibration process is illustrated in FIG. 8.

Figure 5:
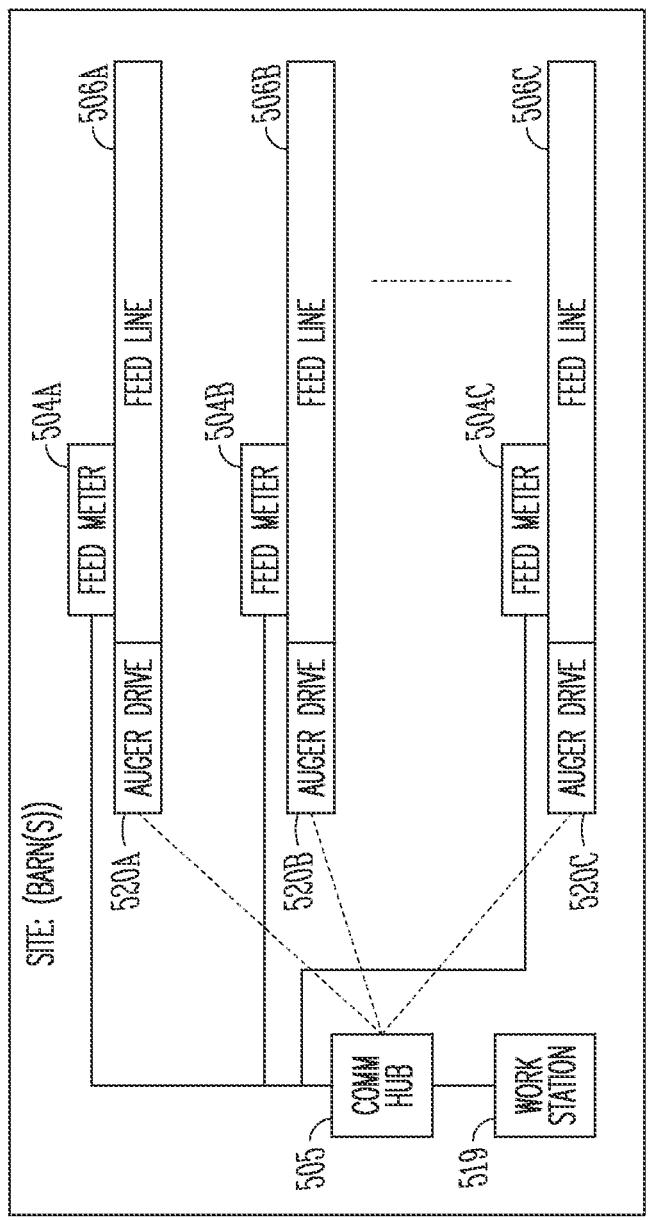
FIG. 5 illustrates an embodiment of a feed meter system comprising multiple feed meters.

FIG. 5 illustrates an embodiment of a feed meter system comprising multiple feed meters 504A-C. The illustrated feed meter system is on a single farm site that may include one or more barns. The feed meter system includes feed lines 506A-C, and a feed meter attached to each of the feed lines to provide a measure of mass flow of the feed through the feed line. The feed meter system includes a communication hub 505 configured to communicate with each of the feed meters 504A-C. The communication from the communication hub may be a wired connection, or may be a wireless connection. The communication hub is also connected to a work station 519 on-site, which can be used to monitor the fed flow through the feed lines. A personal computer may be programmed to function as the work station, for example. The work station may be in the barn, or in one of the barns, or in another building on the farm site. The communication between the communication hub and the work station may be wired or wireless connection. In some embodiments, a user communicates to the communication hub, or to the feed meter through the communication hub, using a web browser. This web browser may be on the local work station, and may communicate with the communication hub through an Ethernet cable or other wired connection. In some embodiments, the communication hub 505 further includes a communication connection to the auger drives 520A-C. The auger drives are motors that turn the augers within the flexible auger feed lines. The communication connection to the auger drives allow the communication hub to detect whether the auger drives are operating, and in some embodiments control the on/off control of the auger drives. For example, some embodiments of the communication hub provide a notice or an alert that the feed bin is empty, and also send a command to the auger drive to turn off if the feed bin is empty. In another example, some embodiments of the communication hub provide a notice or an alert if the detected mass flow of the feed is out of the range of normal values, and can control the auger drive to only allow the auger drive to run for a set period of time. The system may be configured to initiate the control of the auger drives at the communication hub or at the work station.

Figure 6:
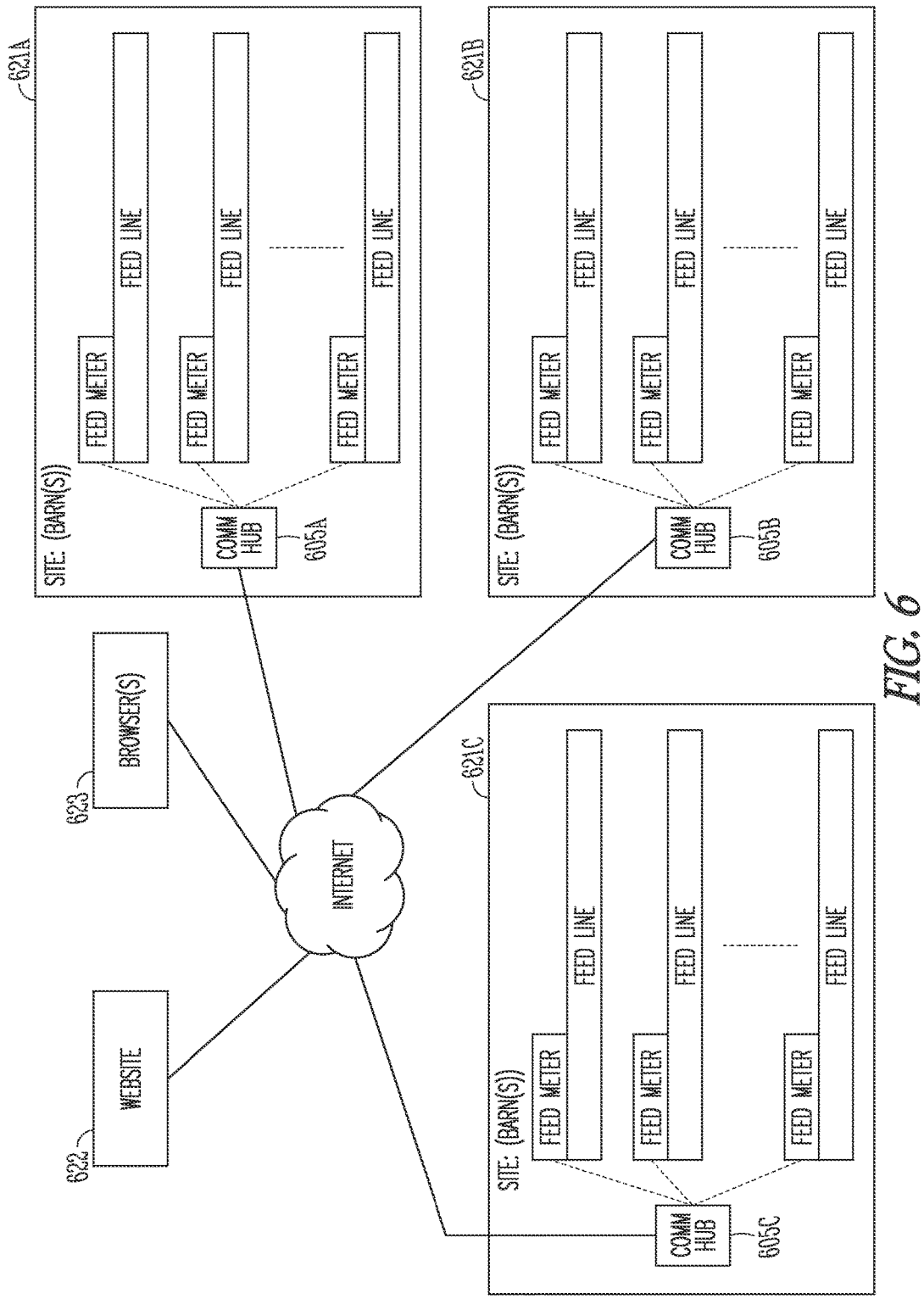
FIG. 6 illustrates an embodiment of a feed meter system comprising multiple feed meters at multiple sites (e.g. farms), where each site may include one or more barns.
Figure 7:
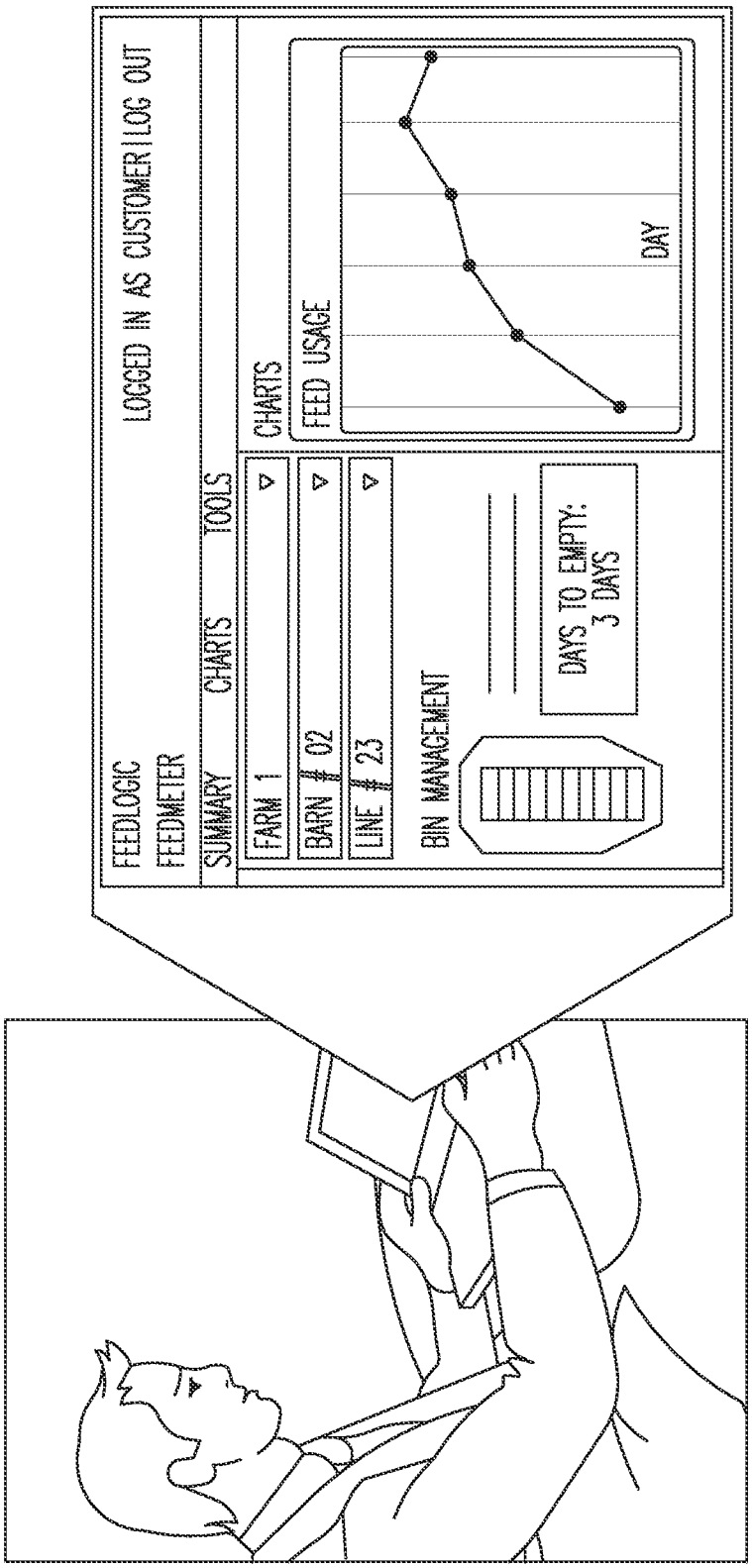
FIG. 7 illustrates an embodiment of a website accessed by a browser application in a computer.

FIG. 6 illustrates an embodiment of a feed meter system comprising multiple feed meters at multiple sites (e.g. farms), where each site may include one or more barns. The illustrated system includes three separate sites 621A-C, where each site includes a communication hub 605A-C to communicate with the feed meters at the site. The communication hubs may also be configured to control auger drives, such as is illustrated with respect to FIG. 5. The communication hubs are configured to connect, using wired and/or wireless connections, to a website 622 through an Internet connection to push the feed meter data to the website. The website is accessible through browser(s) 623 operating on desktop computer(s) or operating on portable device(s) that are capable of accessing web pages through the Internet connection such as notebook or laptop computer(s), smart phone(s), and tablet(s). FIG. 7 illustrates an embodiment of a website accessed by a browser application in a computer, where the user is monitoring feed usage for feed line 23 in barn 2 at farm 1. The website communicates through the browser the estimated days to an empty bin is three days. In some embodiments, the system is configured to allow a remote browser to access and program user-settable features within the communication hub, or access and program user-settable features within the feed meter through the communication hub.

Some embodiments use a visual alarm such as a flashing red light on the communication hub, by way of example and not limitation, to indicate a fault condition or to alert the user of a condition of the feed system (e.g. an empty or near empty feed bin or an empty or near-empty micro-ingredient container or detected bridging of feed within the feed bin). Some embodiments send email, text message, and/or place a telephone call upon an alarm condition using a wireless or Ethernet connection from the device to an outside communications service. Some embodiments implement a number of optional and user-settable fail-safe conditions, such as not running the feed line at all if the micro dispenser is empty or is malfunctioning or, for systems mixing feed from primary and secondary feed lines, stopping the lines if one of the lines is empty or malfunctioning.

The programming monitors input channels to determine the flow of feed through the flex auger system. An input channel is monitored to detect that the auger motor is operating. Some system embodiments control the auger motor [on/off] through the use of an output channel. When the software detects that the auger is operating, the system continuously monitors the flow of feed through the auger. Some system embodiments maintain an internal database recording events and durations. Device activities/events are recorded and time stamped, which enables the retrieval of accurate information such as, but not limited to, feed dispensation, micronutrient dispensation, blend data, and error conditions. Communication capabilities will also be included in the software, enabling end users to download event data. In some embodiments, the end users use the communication capabilities to adjust the ratio of ingredients.

FIG. 8 illustrates an embodiment of a method for calibrating the feed meter 304 of FIG. 3 after it is connected to the feed line. The calibration routine is used to identify a full feed line and an empty feed line, which can be used to appropriately adjust the tension between the feed meter and the ceiling or other structure to allow the load cell to properly operate over the range of weights between an empty feed line and a full feed line, and which also can be used by algorithms to determine whether a measured load cell value represents a full feed line, and empty feed line, or a measure between full and empty.

At 824, a determination is made whether the feed line is empty. If the feed line is empty, the method proceeds to 825, where the calibration switch illustrated at 318 in FIG. 3 is toggled to begin the calibration routine. At 826, a determination is made whether the tension is within the proper range for the load cell to operate. If the tension is not in the proper range, the tension between the structure (e.g. barn) and the feed line is adjusted at 827, such as may be performed using the tension adjustment 313 illustrated in FIG. 3. If the tension is within the proper range for the load cell, the method proceeds to 828 where the motor is turned on to run the auger to fill the metered feed line with feed and the motor is turned off after the metered feed line is filled. At 829, a determination is made whether the filled feed line is too heavy for the load cell. A fault notice is provided at 830 if the filled feed line is too heavy. If the filled feed line is not too heavy for the load cell, the method proceeds to 831, where the calibration switch is toggled to end the calibration routine.

The illustrated feed meter in FIG. 3 includes indicator lights 317. By way of example, one of the LED lights (referred to in the table below as LED 1) can be used to display the current state of the feed meter, and the other of the LED lights (referred to in the table below as LED 2) can be used to display the status of the calibration process.

| LED 1: Current State of Feedmeter | |
| --- | --- |
| OFF | No power. |
| SOLID RED | Power, but feedmeter has not received commands from communication hub. |
| BLINK RED | No calibration information. |
| BLINK GREEN | Calibrating. |
| SOLID GREEN | Feedmeter is functioning normally, and feed line is NORMAL. |
| BLINK BLUE | Feedmeter is functioning normally, and feed line is BRIDGED |
| SOLID BLUE | Feedmeter is functioning normally, and feed line is EMPTY. |
| LED 2: Status of Calibration | |
| BLINK RED (BURST OF 3) | For the empty calibration, the tension in the tensioning rod is too high. |
| BLINK RED (SLOW) | For the empty calibration, the tension in the tensioning rod is too low. |
| SOLID RED | For the empty calibration, the tensioning rod is properly tensioned. |
| BLINK BLUE | Feedmeter is waiting for a BRIDGED value, when line is full. |
| BLINK RED (BURST OF 5) | Feedmeter is overloaded by the line's weight. |

In an embodiment of the calibration routine, LED 2 turns red when the switch is toggled to enter the calibration routine. A blinking red light indicates that the tension is not in the proper range for the load cell. The blinking pattern may be used to determine if the tension is too low or too high. For example, when an empty line is being calibrated, a steadily blinking red light indicates too little tension, and a quick burst of three blinking red lights indicates too much tension. When the tension is within the proper range for the load cell, the blinking red light becomes a non-blinking red light. The tension adjuster is locked in place when the tension is proper. For example, nuts above and below a turn buckle can be used to lock the turn buckle in place. When the switch is toggled again, the previously red light may flash blue to indicate that the calibration routine ready for a bridged value when the feed line is filled with the intended feed. If LED 2 is red and blinking in rapid bursts of 5, the weight of the line and feed is too great for the meter's load cell. With a filled feed line, and with the auger turned off, the calibration switch is toggled to complete the calibration routine.

Figure 9:
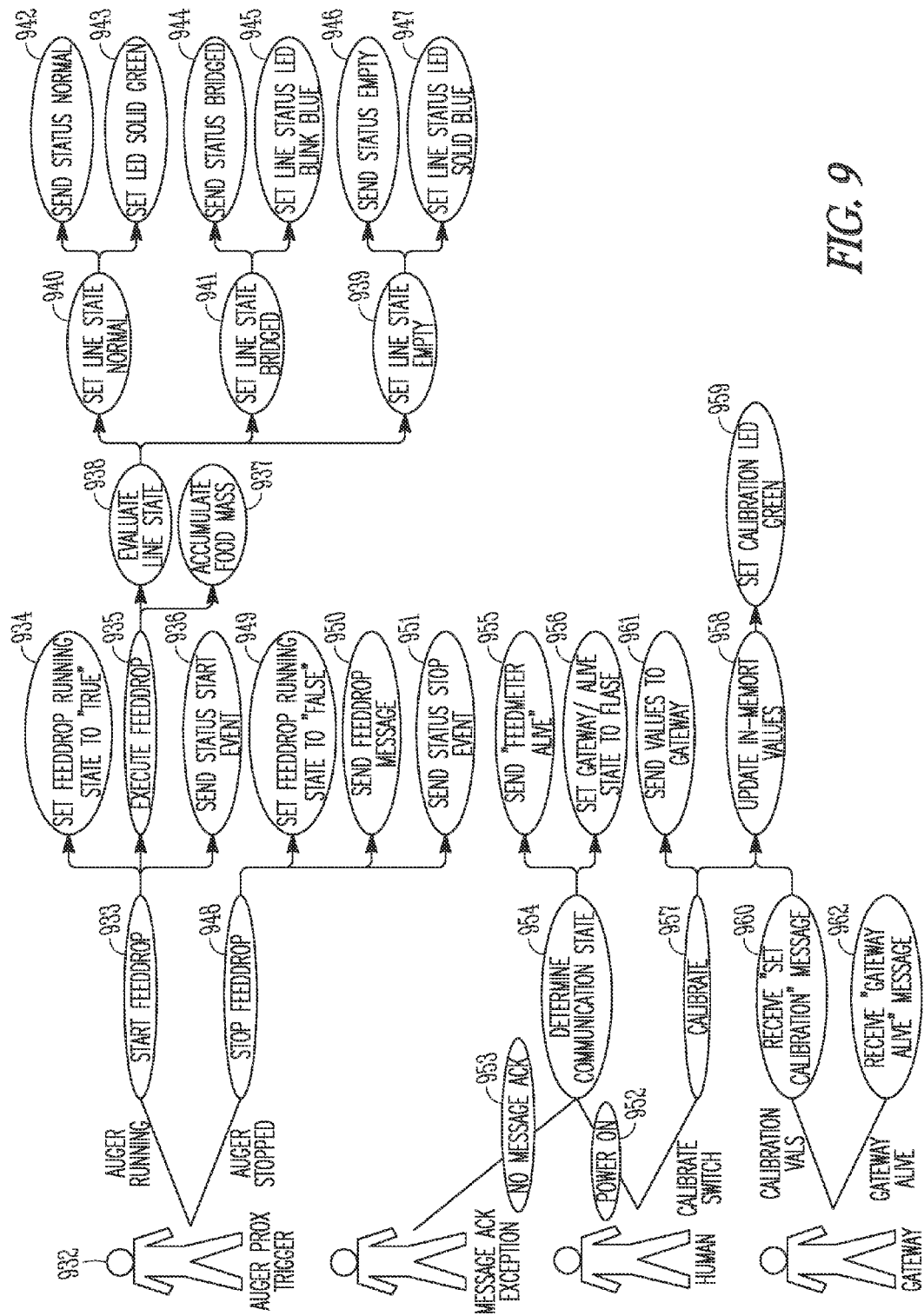
FIG. 9 illustrates an embodiment of a process implemented by the feed meter for sending status notifications.

FIG. 9 illustrates an embodiment of a process implemented by the feed meter for sending status notifications. The notifications or notices may function as messages, alarms or alerts that may be delivered to the user immediately or during a subsequent communication session, or that may be seen when the user logs into the website, for example. At 932, a determination is made regarding whether the auger is running or stopped. This determination may be made determined using the inductive sensor or the vibrations detected by the load cell. If the auger is running, the process enters a feed drop routine 933, in which the feed drop running state is set to "true" 934, the feed drop is executed 935, and the "start event" status is sent and/or recorded 936. Feed mass flow measurements are taken and accumulated at 937. The line state is evaluated at 938, wherein a determination is made regarding whether the feed line is empty 939, normal or full 940, or bridged 941 indicating that there is a feed bridge within the feed bin. The bridge value can be a user-settable value. By way of example and not limitation, the system may be preprogrammed to provide a default bridge value (e.g. 30% of a filled feed line). A user may change this user-settable setting. For example, a local or remote browser may be used to communicate with the communication hub to change the bridge value. If it is determined that the line state is normal, a normal status signal is sent 942 to the communication hub, and a light on the feed meter is turned solid green 943. If it is determined that the line state is bridged, a bridge status signal is sent 944 to the communication hub, and a light on the feed meter blinks blue 945. If it is determined that the line state is empty, the empty status signal is sent 946 to the communication hub, and a light on the feed meter turns solid blue 947. If at 932 it is determined that the auger is not running, the process enters the stop feed drop routine 940, in which the feed drop running state is set to false, a feed drop off message is sent, and the stop event is sent and/or recorded.

A communication state 954 is determined when the feed meter is powered on 952, or if communication is lost as may be determined if a message acknowledgement is not received 953. A notice is sent that the feed meter is on or "alive" 955 and the gateway alive state is set to false until the device is recalibrated. A calibration process is performed at 957, as was illustrated in FIG. 8. The values from the calibration process are loaded into the feed meter's memory 958 and a signal 959 (e.g. green lights) is provided indicating that the calibration routine ended. The values from the calibration are also sent to the communication hub 960, which is identified in FIG. 9 as a gateway. The communication hub receives a set calibration message 961 from the feed meter, and receives a "gateway alive" message 962 from the feed meter when the calibration is successfully performed.

Figure 10:
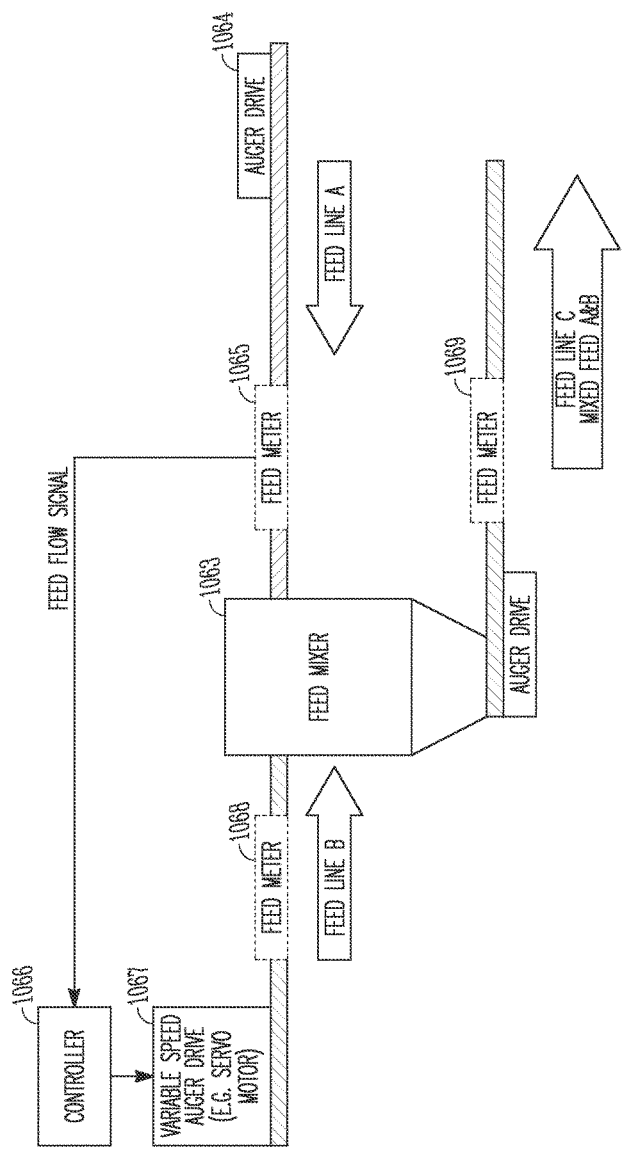
FIG. 10 illustrates an embodiment of a feed line system with a feed mixer.

FIG. 10 illustrates an embodiment of a feed line system with a feed mixer. The feed mixer may also be referred to as a feed blender. The feed line system may be implemented on-farm or at a feed mill. The illustrated feed line system includes at least two feed lines (labeled Feed Line A and Feed Line B), each with a different feed ingredient, that provide the feed ingredients at a desired ratio for mixing in the feed mixer. The feed mixer 1063 mixes the feed ingredients and another feed line (labeled Feed Line C) delivers the mixed feed from the feed mixer. Unlike conventional systems, which intermittently stop the feed flow to weigh the ingredients to provide the appropriate ratio of ingredients in the feed mixture, the illustrated system is able to run Feed Lines A and B to continuously deliver feed ingredients into the feed mixer and monitor and control the ratio of ingredients delivered into the feed mixer, and continuously deliver mixed feed from the feed mixer through Feed Line C. In an on-farm application, for example, the mixed feed may be moved from the feed mixer through Feed Line C into feed lines within a barn for distribution to the feeders in the barn. In another on-farm application, for example, the mixed feed may be moved from the feed mixer through Feed Line C into a feed bin. In a feed mill application, for example, the mixed feed may be moved from the feed mixer through Feed Line C into a storage bin or directly into a truck for transportation to the farm.

Feed Line A includes a flexible auger that is powered by an auger drive 1064. The auger drive 1064 may be a simple on/off motor that turns the flexible auger at "full" speed when the motor is on. The feed flow through Feed Line A, with the auger drive turned on, may be rated by the manufacturer or through testing. A feed meter 1065 is attached to a portion of Feed Line A to provide a measure of the mass flow rate through Feed Line A when the auger drive is turned on. A controller 1066 uses a feed flow signal from the feed meter to determine the current mass flow rate in Feed Line A, and control a variable speed auger drive 1067, such as a stepper motor or servo motor, to deliver a desired mass flow rate in Feed Line B that result in a desired ratio of feed mix in the feed mixer. In some embodiments, the illustrated system further includes an optional feed meter 1068 on Feed Line B and/or an optional feed meter 1069 on Feed Line C. If a feed meter is included on Feed Line B, for example, the controller can use a signal from the feed meter verify that the desired mass flow rate through Feed Line B is actually flowing through Feed Line B into the feed mixer. If a feed meter is included on Feed Line C, for example, the controller can use a signal from the feed meter verify that a desired mass flow rate through Feed Line C is actually flowing from the feed mixer through Feed Line C. In some embodiments, the controller controls the auger drive on Feed Line A and/or the auger drive on Feed Line B, and/or the auger drive on Feed Line C using data received from feed meter 1065 and/or data received from feed meter 1068 and/or data received from feed meter 1069.

FIG. 1 illustrates a feed line system with an in-line applicator 1170 used to mix or blend feed, according to various embodiments. The illustrated feed line system includes a feed bin 1100 next to a livestock barn 1101. A flexible auger system 1102 delivers the feed into the barn 1101. The in-line applicator mixes or blends the feed from the bin with at least one other ingredient 1171 to produce blended feed or mixed feed for distribution to the feeders 1108. The in-line applicator includes a feed meter, such as the feed meter illustrated in FIG. 3, operationally attached to the feed line to determine a mass flow rate of the feed. A communication hub, such as the communication hub illustrated in FIG. 4, can be used to communicate with the feed meter and communicate with work station(s) or other device to present and/or process the feed meter data. The feed meter can be used to measure mass flowing in the flexible auger and provide a mass/time calculation (e.g. pounds or kilograms per minute or pounds or kilograms per second). The feed meter may store the mass flow rate data locally, or store the mass flow rate data in the communication hub or in other devices that communicate directly or indirectly with the communication hub. Mesh network(s) may be used to connect multiple feed meters to a communication hub. In some embodiments, the network is configured to support intermittent communication. For example, communication may be initiated upon the occurrence of an event or expiration of a timer, or communication may not always be available. In some embodiments, the network is cloud based, in which the application and data are stored remotely and are accessed from a web browser. The communication hub may send data, over wired and/or wireless connections, to other devices. The blended feed is delivered past the feed meter through the flexible auger system 1106 to drop tubes 1107 used to deliver the feed down to the feeders 1108.

Figure 11:
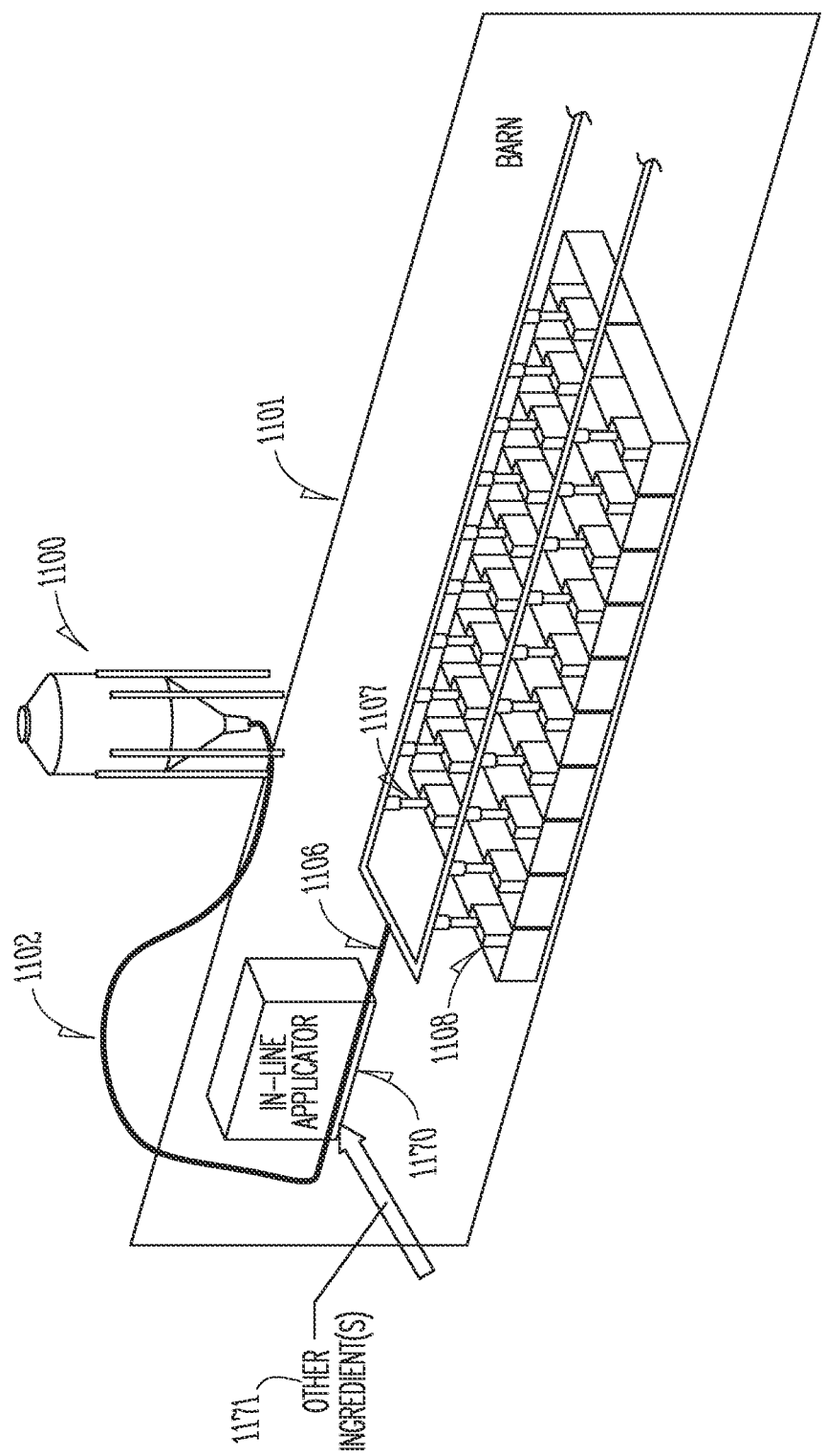
FIG. 11 illustrates an embodiment of a feed line system with an in-line applicator used to mix or blend feed.
Figure 12:
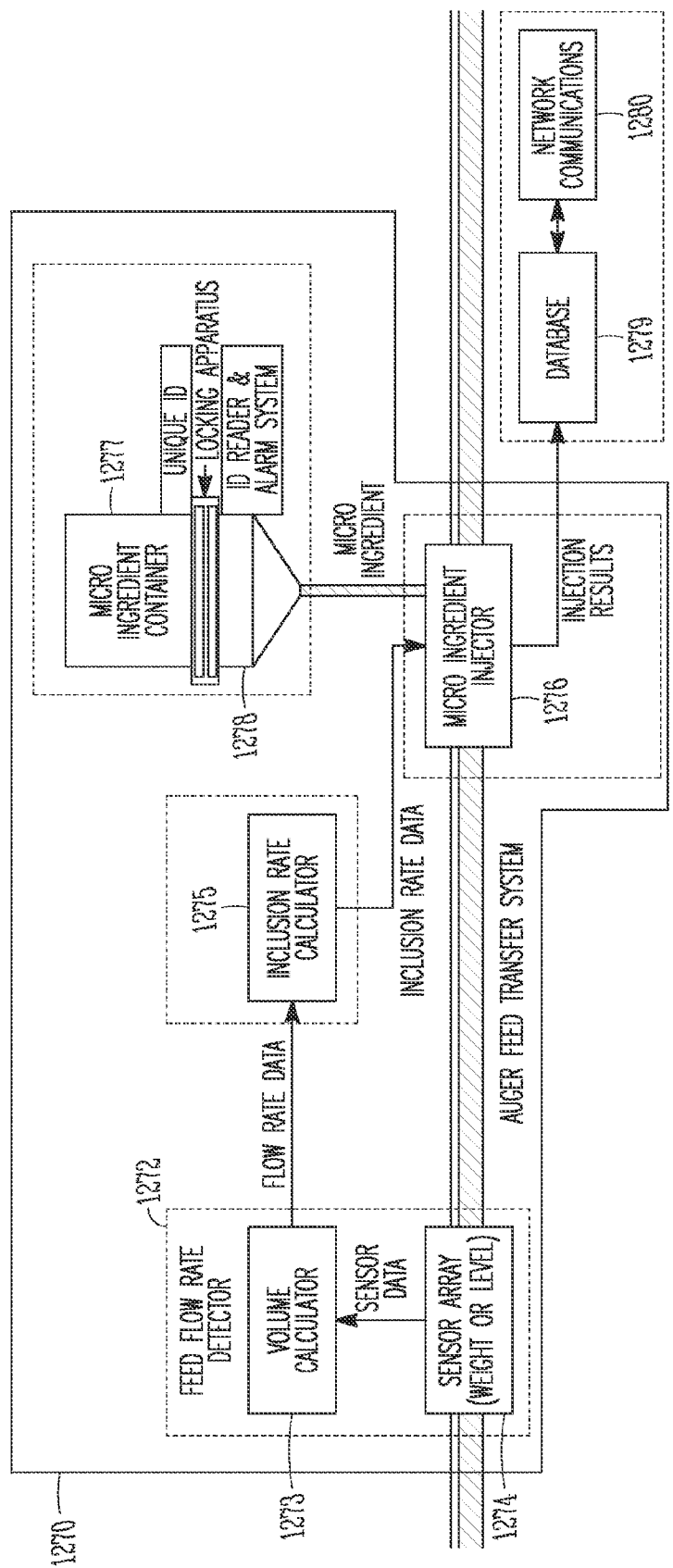
FIG. 12 illustrates an embodiment of an in-line micro-ingredient applicator.

FIG. 12 illustrates an embodiment of an in-line micro-ingredient applicator. The micro-ingredient applicator 1270 may be an embodiment of the in-line applicator 1170 illustrated in FIG. 11. The illustrated in-line micro-ingredient applicator 1270 includes a feed flow rate detector 1272 configured to determine a feed flow rate through the feed transfer system. Some embodiments use a sensory array to sense the level of the feed in a section of the feed transfer system. For example, some embodiments use proximity sensors. These sensors can be used to estimate feed volume in a portion of the feed transfer system at a given time. This volumetric data may be used to estimate the mass of the feed in the feed transfer system at a given time and the volume of the feed passing through the transfer system in a mass/time calculation (e.g. pounds/minute or pounds/second). Some embodiments weigh the feed in a section of the feed transfer system to arrive at this mass/time calculation. For example, in some embodiments, the feed flow rate detector 1272 includes a feed meter, such as the feed meter illustrated in FIG. 3, operationally attached to the feed line and configured to use a load cell to provide a measure of the weight of the feed.

Figure 13:
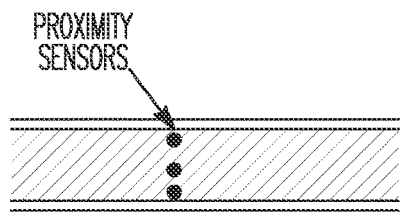
FIGS. 13 and 14 illustrate various embodiments for monitoring feed flow rate.
Figure 14:
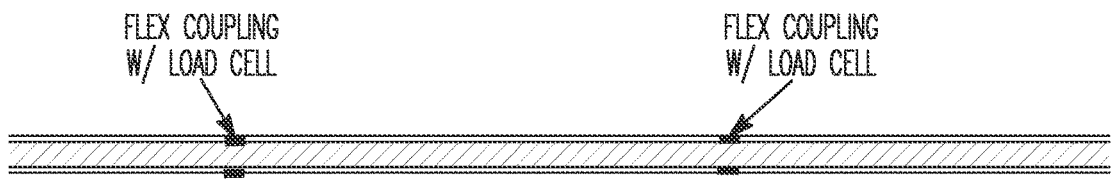

FIGS. 13 and 14 illustrate various embodiments for monitoring feed flow rate. As illustrated in FIG. 13, an embodiment uses proximity or level sensors mounted in specific locations on the circumference of the feed transfer auger housing to measure the volume of feed within the feed section and calculate the total mass of the feed by referring to volumetric/mass ratio calibration data. The system could have a series of look-up tables with calibration data which could be matched to specific feed types and feed densities. Some embodiments use one or more proximity sensors which can be mounted on the outside of a standard plastic auger casing used on feed lines. Multiple sensors can be mounted to gain more data points to improve accuracy. The estimated volume can be used to provide a volumetric calculation of rate. However, feed density changes with the type of ingredients in the main feed mix and other factors such as moisture and temperature. Weighing the feed would eliminate this variable. Some embodiments use load cell(s) to measure actual weight.

As illustrated in FIG. 14, an embodiment uses a flexible coupling on each side of a section of the feed transfer system. This section of the feed transfer system can be hung from one or more load cells to weigh the mass of this section as feed flows through this section. Some embodiments cut a section of the plastic casing, leaving the metal auger inside intact, and reattach the plastic section with flexible couplings at each end. This section can be suspended from the barn ceiling with one or more load cells so that the weight of the feed in that section could be detected with a reasonable level of accuracy. The load cells detect changes in the weight of the feed in this section as it is flowing through. Rapid adjustments to the speed of the auger on the micro-dispenser can be made when the weight changes enough to justify it. A feed meter, as described herein and illustrated in FIG. 3, can be used to measure mass flowing in the flexible auger and provide a mass/time calculation (e.g. pounds or kilograms per minute or pounds or kilograms per second).

With reference again to FIG. 12, the feed flow rate detector 1272 includes a volume calculator 1273, which uses data from the sensor 1274, which may be weight or level data, to calculate volume and mass of the main feed flow. The flow rate data is presented to the inclusion rate calculator 1275, which looks up a desired rate of the micro-ingredient. The micro-ingredient injector 1276 receives inclusion rate data from the calculator, and controls the dosing of a micro-ingredient from the container 1277 into the feed flow. The illustrated container is mounted onto a universal base 1278, which is a standard base configured to be used with containers with different micro-ingredients, and with different types of containers. The base can secure the container in the locked position. The container can include RF identifiers or other types of machine readable identifiers, and the illustrated system provides a base capable of reading RF identifiers on the container. Some system embodiments use one or more load cells on the micro-ingredient container/dispenser assembly to determine current weight and to provide the ability to dispense from the container by using loss in-weight data and periodically comparing that loss-in-weight data with a pre-set load cell/volumetric ratio.

Device events can be stored and time stamped in a database 1279 through a direct or wireless connection. Network communication 1280 (e.g. email, paging, text messages, phone call, etc.) can be used to deliver notices that may function as messages, alerts or alarms. Some embodiments push messages or alarms to a smart phone. This network may be a wired or wireless network. According to some embodiments, one or more micro-ingredients are packaged into a portable container. This container is labeled with a machine-readable identifier that uniquely identifies the container. For example, some embodiments uniquely label each specific container with a radio frequency identification (RFID) tag. The container is mounted or otherwise attached to a dispenser base. The dispenser base may be a universal dispenser base capable of being used to mount a plurality of different container types. A reader on the dispenser base can be used to automatically read the RFID tag and allow automatic identification of the product and/or the container size. The container can be locked onto the universal base and can be color-coded to ensure easy identification for the person loading it onto the dispenser. A visual or audible warning can be used to warn the user if the container is not properly installed on the dispenser or if the dispenser is empty and needs to be replaced. System programming can limit the dispense rate to a pre-set inclusion rate, or can allow a plurality of inclusion rates. Empty containers can be cleaned and refilled for re-use.

Thus, the system is capable of verifying the container, and can automatically limit the inclusion rate to one or more options appropriate for the livestock at that time. Inclusion rates (and applicable calibration calculations) based on manufacturer certifications or the animal owner's desired strategy can be hard programmed into the controller so that the user cannot tamper with inclusion rates, but can only select basic controls such as Start and Stop.

According to various embodiments, the system will not dispense any product until the correct product is loaded. An embodiment implements a password-protected administration function in software to override or to change to a different product. Some embodiments provide an option to have the feed line continue to fill feeders with feed without the any product being injected. This event can be recorded and tracked until the problem is rectified.

Various embodiments collect data regarding volume in one or more micro-ingredient dispensing containers located at one or more locations and make that data available in preset reports when the user polls a locally-stored database (pull method). Other embodiments use wireless or wired connections to automatically extract the data at specified intervals from the dispensing containers and upload the data to an off-site database host device (push method). Customized reports based on this data can then be accessed at any time via a Web server. The push method of data collection and reporting can also provide instant alerts via e-mail or other method when volumes in dispensing containers reach critically low levels or when they are totally empty.

Various embodiments provide a micro-ingredient dispenser on a truck so that ingredients can be added to a base feed mix while it is being loaded into a bin on a farm, and various embodiments provide a micro-ingredient dispenser at a feed mill between the main mixer and the load-out auger so that so that ingredients can be added to a base feed mix while it is being loaded into a truck. The flow of feed in the load out auger is measured, and the micro ingredient is added downstream from the measurement point.

Some embodiments measure feed consumption and automatically change inclusion rates of a micro-ingredient if consumption rates are higher or lower than a preset norm based on the age of the animals being fed, the weight of the animals, or the temperature or other environmental inside the barn. Other inputs may be used in a programmed algorithm to change inclusion rates. The system can be used to help discover the "norm" for the user under typical commercial operating conditions. One of the biggest challenges of livestock production is the level of variation in the production process. A biological system has variables such as genetic variation, unexpected health challenges, temperature and humidity changes, etc. Other variations may be caused by poor management (allowing feed bins to run empty, not setting temperature controllers correctly, not adjusting feeders correctly, not treating sick animals correctly, etc). Today, most producers are poorly equipped to deal with variation because they do not have a good way to measure their current processes on a daily basis and they do not have a good way to respond to the variation (e.g. rapidly adding a micro ingredient to feed when animals get sick or being notified when a bin is empty and needs feed delivered immediately). A goal of the micro applicator is first of all to provide a better way to measure the important processes more effectively and with higher inmmediacy and secondly to respond to variation from the norm automatically as much as possible. For the purposes of the micro-applicator, the producer's existing information on the norm (average daily feed intake; average daily gain; feed conversion) would be used as a baseline and then it would be adjusted over time as the system generated additional data (e.g. more accurate average daily feed intake).

Figure 15:
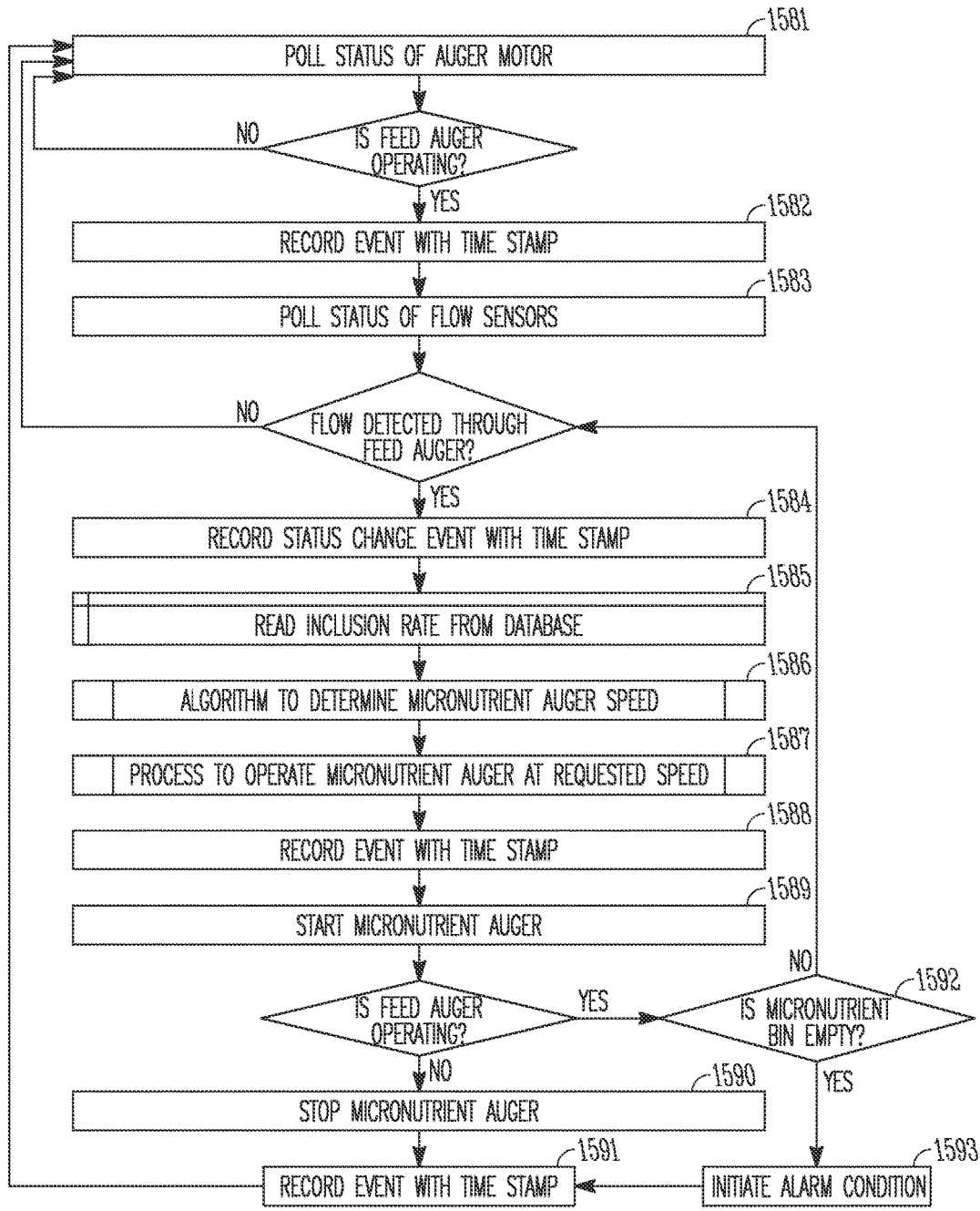
FIG. 15 illustrates a flow diagram of software operating in the feed line system, according to various embodiments.

FIG. 15 illustrates a flow diagram of software operating in the feed line system, according to various embodiments. At 1581, the status of the auger motor is polled. If the auger is not operating, the process returns to 1581. If the auger is operating, the event is recorded with a time stamp 1582, and the status of flow sensors is polled at 1583. If flow is detected, then the status change event is recorded with a time stamp 1584. The inclusion rate is read from the database 1585 and an algorithm is used to determine the appropriate initial micronutrient auger speed 1586 to provide the desired inclusion rate, and a process is implemented at 1587 to operate the micronutrient auger at a requested speed. The event is recorded with a time stamp 1588 and the micronutrient auger motor is turned on at the initial speed 1589. While the feed auger continues to run, the flow sensors are polled multiple times per second and the speed of the micronutrient auger is adjusted within a specified period of time to ensure accurate inclusion rates in relation to actual feed flow. If the feed auger is not operating, the micronutrient auger is stopped 1590, the event is recorded with a time stamp 1591 and the process returns to 1581. If the micronutrient container is determined to be empty or the micronutrient auger is not capable of dispensing sufficient product to meet adequate inclusion requirements, the micronutrient auger is stopped 1592, and an alarm condition 1593 is initiated, and this event is recorded 1591. The system can be programmed to either prevent the main feed auger from operating until the alarm condition is resolved, or allow the main feed auger to continue to run without inclusion of micronutrients, or allow the main feed auger to continue to run for a limited period of time without inclusion of microingredients.

This document refers to a flexible auger feed transport system. Other feed transport system may be used. Those of ordinary skill in the art will understand, upon reading and comprehending this document, how to incorporate the teaching herein to use other feed transport systems. According to various embodiments, the flow of feed is measured through a flexible auger feed transport system. The total feed volume traveling through the system is calculated in mass/minute. This calculation is performed repeatedly to continually monitor the total feed volume traveling through the system. Various embodiments record and time stamp feed volume data at frequent intervals. These time stamped records enable the calculation and reporting of total volume of feed delivered over specific periods of time (e.g. per hour, per day, per week).

According to various embodiments, a feed meter is used to determine the total feed flow rate through a flexible auger transport system, and this total feed flow rate is used to determine correct inclusion rate of an ingredient to the feed flow downstream of the measurement point. According to various embodiments, one or more ingredients are added to a main feed flow uninterrupted. The rate of flow of an ingredient added into a feed flow downstream from a measurement point on a feed line can be rapidly adjusted using stepper or servo motors which can change speed in less than a second to ensure inclusion rates that are consistently accurate and provide proper mixing of ingredient(s) into a feed mix. As the feed flow is being measured in-line and upstream from the feed mixing point, this "instant blend" method does not require any foreknowledge of the amount to be mixed. Rather, the system is programmed to know an optimal ratio of ingredient(s) to the feed mix, and is able to accurately add these ingredients in an amount that is appropriate for the measured feed flow in the feed line. This "instant blend" method contrasts with a batching system where the required amount to be mixed must be known beforehand. According to various embodiments, the system is programmed to automatically adjust inclusion rates at specific time intervals or when specific volumes of feed mix have been consumed.

Some embodiments determine consumption by measuring total amount delivered between two time-stamped, feed line "full" events. For example, the feed line is running and a sensor in the drop tube at the end of the line indicates it is full at 9:00 am. The feed line does not run for a period of time (typically determined by a cycle timer). Meanwhile, the animals are eating and the feed in the tube drops down so that the sensor no longer sees feed. The feed line recommences operation either immediately when the sensor no longer sees feed (if no delay is set) or a specified time after the sensor no longer sees feed (cycle delay). The feed line runs for 30 minutes before the feed builds up and is seen by the end sensor again. If the amount of feed traveling through the line during this 30 minute "on-time" is known and if the feed line full times are known, feed consumption or feed disappearance can be determined. For example, if the total amount of feed delivered was 500 pounds over 90 minutes between full sensor activations, then consumption is: total volume delivered (500 lbs)/total time between full sensor activations (90 minutes)=5.56 lbs/minute or about 333 lbs/hour or about 8000 lbs/day. The more frequent the data points (full events) in any 24-hour period, the more accurate the average daily feed intake measurement will be. This is far more accurate than the standard industry practice of measuring daily feed intake by dividing total tons delivered to a farm over an entire growth period (4-6 months for hogs; 7-8 weeks for chickens) by the number of days the animals were in the facility for that growth period.

According to various embodiments, the timing and amount of ingredient inclusion (e.g. micro-ingredient inclusion or other ingredient) into feed mixes is recorded into a database. An event history identifies each drop event (one continuous dispensing event where the dispensing auger starts operation and stops operation). Each event includes information on the product injected, the amount injected by weight, and the total time of the dispensing event. This information can be used to create reports on the total quantity of product dispensed over specific periods of time and the current remaining volume in the dispensing container. The refilling or reloading events of the container can be time-stamped so that it is known how much has been dispensed since refilling or reloading and how much should be left in the container.

Various embodiments extract data on feed flow rates through a feed line using a feed meter. For example, various embodiments extract data regarding the timing and amount of micro-ingredient inclusion into feed mixes. This data may be extracted using local area and wide area wireless communications systems. Thus, the system enables remote extraction of data, and does not require a wired connection to extract the data. A wireless protocol such as 802.11g may be used to network locally to a personal computer or server or other device on site, which can be connected to the Internet for remote access. Some embodiments use a cellular modem or other wide area wireless modem inside the control box of each dispensing device to enable a direct connection from a remote location. Some embodiments use close-range wireless such as Blue Tooth to extract the data to a hand-held device. Data, notices, and/or alerts may be pushed out through the network. For example, smart phones may receive data, notices and/or alerts pushed out from the communication hub. Data, notices and/or alerts may be pulled out, by polling a database local to the feed line, such as a database in the feed meter or in the communication hub.

A product may be more effective when the inclusion rate of a product is altered gradually ("phase fed") over a specified period of time (e.g. changes once a day) rather than being included at one rate for an entire treatment period or changed once over that treatment period. Some embodiments provide the ability to "phase feed" micro-ingredients or other ingredients in the feed.

Weight is important to swine producers around marketing time (because they get paid more if the animals are shipped within a specific weight range). There are a number of companies providing weight scales in hog barns to report average weights, but these systems are difficult to manage and maintain. So there is a need for a better way to get weight information. Poultry producers adjust diets if the weight is not correct after a specific number of days into a growth period.

There are some existing growth models which can draw a very close relationship between feed intake and growth. Using these growth models, the present subject matter may be used to estimate the weight of animals in a barn at any point in time by measuring feed intake.

The present subject matter not only detects that flow is occurring, but also determines the flow rate as feed flow and density can vary because of temperature, moisture/humidity, ingredients in the feed, and the like. This detected flow rate can be used as an input for determining the inclusion rate of other ingredients. This detected flow rate is used as an input for determining the inclusion rate of an ingredient or microingredient. For example, some embodiments use software to instruct the micronutrient dispenser to operate at a speed that dispenses the correct amount of micronutrient for the flow rate of feed (at a predetermined, user selectable rate) based on a table of calibration data. These calculations and the associated control signals to adjust flow of micronutrient happen rapidly, e.g. on the order of microseconds, to ensure an accurate blend as the feed moves inline through the feed lines. The micronutrient container could also be suspended on one or more load cells to determine the weight of the product currently in the container or the weight of the product dispensed at specific times.

The in-line applicator may be used to add a dry ingredient to a dry product as the dry product flows through transfer lines. The in-line applicator uses sensors to provide a measure of volume or weight, and uses this measure to provide an estimate of the flow rate of the dry product past the in-line applicator. This on-the-fly flow rate determination of the dry product allows the in-line applicator to adjust the inclusion rate of the added ingredient into the flow of the dry product. The in-line applicator is configured to control the inclusion rate of a dry ingredient into the dry product flow. The in-line applicator could be configured to control an inclusion rate of a wet ingredient into the dry product flow. Again, the on-the-fly flow rate determination of the dry product allows the in-line applicator to adjust the inclusion rate of the added wet ingredient into the flow of the dry product.

The above detailed description is intended to be illustrative, and not restrictive. The scope of the invention should, therefore, be determined with reference to the appended claims, along with the full scope of equivalents to which such claims are legally entitled.

What is claimed is:

1. A method for monitoring movement of livestock feed through a flexible auger feed line system that includes a flexible pipe and a flexible auger operably positioned within the flexible pipe, the method comprising:
    monitoring feed flow through a metered section of the flexible pipe using a feed meter attached to the flexible pipe, wherein the feed meter includes a load cell configured to detect strain induced by feed mass within the metered section, and wherein monitoring feed flow includes using a process implemented by the feed meter that is attached to the flexible pipe to:
    determine a measure of mass flow of the livestock feed, using the load cell, when the feed moves through the metered section; and
    determine a feed line status including:
        determine that the metered section is empty based on the measured mass flow of the livestock feed;
        determined that the metered section is full of feed based on the measured mass flow of the livestock feed; or
        determine that the feed is bridged based on the measured mass flow of the livestock feed; and
    communicating information, including the determined feedline line status, pertaining to the measure of mass flow of the livestock feed from the feed meter that is attached to the flexible pipe to a communication hub, that is configured to communicate with the feed meter, and communicating feed flow data from the communication hub and to another device other than the communication hub and the feed meter.

2. The method of claim 1, wherein communicating information pertaining to the measure of mass flow of the livestock feed from the feed meter to the communication hub includes using a wireless network to communicate between the feed meter and the communication hub.

3. The method of claim 1, further comprising:
    communicating information pertaining to the measure of the mass flow of the livestock feed from the communication hub through an Internet connection to a website; and
    pushing information pertaining to the measure of the mass flow of the livestock feed from the website to a device that supports a web browser.

4. The method of claim 1, further comprising:
    communicating information pertaining to the measure of the mass flow of the livestock feed from the communication hub through an Internet connection to a website; and
    using the website to poll the communication hub to pull information pertaining to the measure of the mass flow of the livestock feed to the website.

5. The method of claim 1, further comprising communicating information pertaining to the measure of the mass flow of the livestock feed from the communication hub through an Internet connection to a website, wherein the flexible pipe is a flexible auger feed line configured to draw livestock feed from a feed bin into feeders, the method further comprising providing feed consumption data for the feed line on the website.

6. The method of claim 1, wherein the metered section of the flexible pipe includes fixed ends and a flexible center region between the fixed ends, and wherein providing the measure of mass flow of the livestock feed, using the load cell, when the livestock feed moves through the metered section includes using the load cell to provide a measure of mass at the flexible center region of the metered section.

7. The method of claim 1, further comprising calibrating the feed meter, wherein calibrating the feed meter includes determining load cell readings for an empty metered section and a full metered section.

8. The method of claim 1, wherein the movement of livestock feed through the flexible auger feed line system includes movement of a feed ingredient through the flexible pipe to a mixing element, the method further comprising:
    moving another feed ingredient to the mixing element;
    controlling an inclusion rate of the other feed ingredient to the mixing element using the measure of mass flow of feed provided by the feed meter;
    mixing, at the mixing element, the feed ingredient and the other feed ingredient to provide mixed ingredients, and moving the mixed ingredients away from the mixing element, wherein moving the feed ingredient, moving the other feed ingredient, mixing, and moving the mixed ingredients are simultaneously performed.

* * * * *